United States Patent
Nakamura et al.

(10) Patent No.: US 9,569,404 B2
(45) Date of Patent: Feb. 14, 2017

(54) IN-VEHICLE CONTROLLER AND NON-TRANSITORY TANGIBLE COMPUTER READABLE MEDIUM

(71) Applicant: DENSO CORPORATION, Kariya, Aichi-pref. (JP)

(72) Inventors: Aya Nakamura, Kiyosu (JP); Masayuki Kobayashi, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 639 days.

(21) Appl. No.: 13/719,767

(22) Filed: Dec. 19, 2012

(65) Prior Publication Data

US 2013/0173767 A1 Jul. 4, 2013

(30) Foreign Application Priority Data

Dec. 28, 2011 (JP) .................. 2011-289237

(51) Int. Cl.
*G06F 7/00* (2006.01)
*G06F 17/00* (2006.01)
(Continued)

(52) U.S. Cl.
CPC .............. *G06F 17/00* (2013.01); *B60W 50/00* (2013.01); *G06F 8/71* (2013.01); *G06F 15/177* (2013.01);
(Continued)

(58) Field of Classification Search
CPC ........ B60W 10/00; B60W 50/00; G06F 17/00; G06F 8/71; G06F 15/177; G06F 17/30091; H04L 43/0876; H04L 43/0811
(Continued)

(56) References Cited

U.S. PATENT DOCUMENTS

| | | | |
|---|---|---|---|
| 4,985,835 A | * | 1/1991 | Sterler et al. ................... 701/46 |
| 6,047,278 A | | 4/2000 | Winkelmann |

(Continued)

FOREIGN PATENT DOCUMENTS

| | | |
|---|---|---|
| JP | 03-112550 | 11/1991 |
| JP | 2002-331882 | 11/2002 |

(Continued)

OTHER PUBLICATIONS

Office action dated Dec. 10, 2013 in corresponding JP Application No. 2011-289237.

*Primary Examiner* — Viet Vu

(74) *Attorney, Agent, or Firm* — Harness, Dickey & Pierce, P.L.C.

(57) ABSTRACT

An in-vehicle controller includes: a first control element for outputting a first output, which corresponds to functional safety standards, in response to a input; a first platform element for controlling a first software in the first control element; a second control element for outputting a second output, which does not correspond to the functional safety standards, in response to the input; a second platform element for controlling a second software in the second control element; and a comparison coupling element for comparing and coupling the first output and the second output, and for outputting a coupled output to an external control object device. The first platform element controls the first software in the first control element independently from the second platform element, which controls the second software in the second control element.

15 Claims, 13 Drawing Sheets

(51) Int. Cl.
    *G06F 9/44*      (2006.01)
    *G06F 17/30*     (2006.01)
    *H04L 12/26*     (2006.01)
    *G06F 15/177*    (2006.01)
    *B60W 50/00*     (2006.01)

(52) U.S. Cl.
    CPC ..... *G06F 17/30091* (2013.01); *H04L 43/0876* (2013.01); *H04L 43/0811* (2013.01)

(58) Field of Classification Search
    USPC ............................................. 701/36; 717/120
    See application file for complete search history.

(56) References Cited

U.S. PATENT DOCUMENTS

| | | | |
|---|---|---|---|
| 7,469,179 B2* | 12/2008 | Thissen et al. ................. | 701/70 |
| 2005/0133006 A1* | 6/2005 | Frenz ........................ | F02D 9/02 |
| | | | 123/399 |
| 2005/0223263 A1 | 10/2005 | Flores et al. | |
| 2005/0251308 A1 | 11/2005 | Funcke et al. | |
| 2009/0024230 A1 | 1/2009 | Hioka et al. | |
| 2009/0300595 A1* | 12/2009 | Moran et al. ................. | 717/170 |
| 2010/0318325 A1* | 12/2010 | Esch et al. ................... | 702/189 |
| 2011/0241447 A1* | 10/2011 | Ando ................. | G05B 19/4063 |
| | | | 307/326 |

FOREIGN PATENT DOCUMENTS

| | | |
|---|---|---|
| JP | 2004-106665 | 4/2004 |
| JP | 2010-244213 | 10/2010 |
| JP | 2010-271759 | 12/2010 |

* cited by examiner

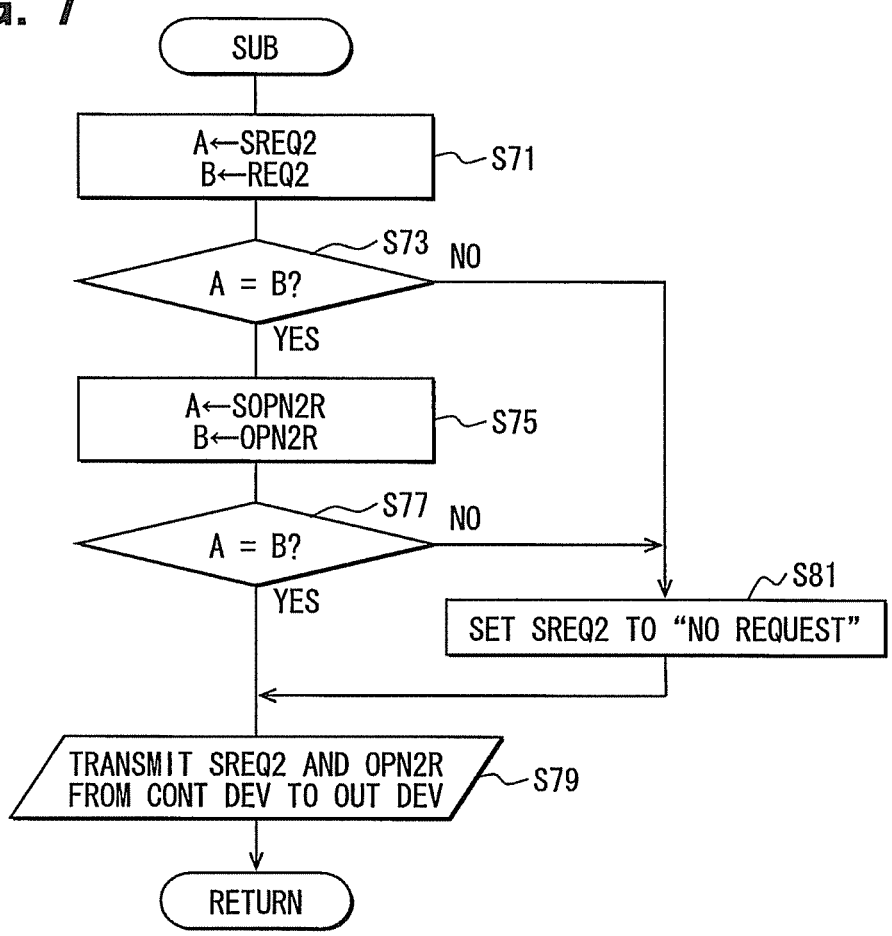
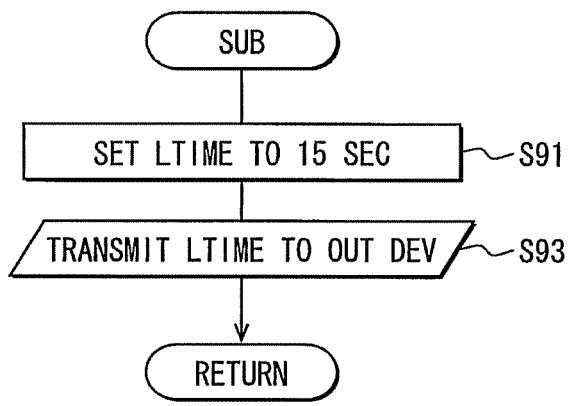

FIG. 13A

⟨FUNC DEF OF SEQ & TIME MONITOR⟩

```
void seqchk_error(void)
{
  /* PROCESS AT FAILURE OF EXE ORDER OR EXE TIME */
  return;
}
void seqchk_start(int* counter, int* timer)
{
  *(counter) = *(counter) + 1;
  *(timer) = 0;
  return;
}
void seqchk_end(int* counter, int order, int* timer, int time)
{
  if ((*(counter) != (order + 1)) || (*(timer) > time)) {
    seqchk_error();
  }
  return;
}
void seqchk_count(int* timer)
{
  *(timer) = *(timer) + 1;
  return;
}
```

FIG. 13B

⟨USAGE WAY OF SEQ & TIME MONITOR⟩

```
int timer1, timer2, timer3;
int counter = 0;
. . .
seqchk_start(&counter, &timer1);
function1();
seqchk_start(&counter, &timer2);
seqchk_end(&counter, 1, &timer1, 5);  /* CHECK EXE ORDER AND TIME IN FUNC 1 */
function2();
seqchk_start(&counter, &timer3);
seqchk_end(&counter, 2, &timer2, 10); /* CHECK EXE ORDER AND TIME IN FUNC 1 */
. . .
```

```
__interrupt void periodic_1us(void)
{
  seqchk_count(&timer1);
  seqchk_count(&timer2);
  seqchk_count(&timer3);
  return;
}
```

FIG. 14A

⟨FUNC DEF OF READ/WRITE PRO & CALC MONITOR⟩

```
void artmemchk_error(void)
{
    /* PROCESS AT FAILURE OF READ/WRITE PRO OR CALC */
    return;
} void artmemchk_write(int* adr, int data)
{
    *(adr)     = data;
    *(adr + 1) = ~data;

return;
} void artmemchk_read(int* adr)
{
    int data1 = *(adr);
    int data2 = *(adr + 1);

if (~data1 != data2) {
        artmemchk_error();
    }
    return;
}
```

FIG. 14B

⟨USAGE WAY OF READ/WRITE PRO & CALC MONITOR⟩

```
...
artmemchk_write(0x1FFC, 0x55);
artmemchk_read(0x1FFC); /* CHECK ADDRESS 0x1FFC IN MEM */ artmemchk_write(0x1FFE, 0xAA);
artmemchk_read(0x1FFE); /* CHECK ADDRESS 0x1FFE IN MEM */
...
```

IN-VEHICLE CONTROLLER AND NON-TRANSITORY TANGIBLE COMPUTER READABLE MEDIUM

CROSS REFERENCE TO RELATED APPLICATION

This application is based on Japanese Patent Application No. 2011-289237 filed on Dec. 28, 2011, the disclosure of which is incorporated herein by reference.

TECHNICAL FIELD

The present disclosure relates to an in-vehicle controller and a non-transitory tangible computer readable medium. The in-vehicle controller controls according to functional safety standards, and the tangible computer readable medium includes instructions for providing the in-vehicle controller.

BACKGROUND

Conventionally, in various apparatus such as a robot and transport equipment, a control process for performing main operations and main functions of the device and a control process for securing safety of the device are executed concurrently. For example, JP-A-2010-271759 teaches this apparatus.

However, when the apparatus is controlled, and a requirement level for functional safety of the apparatus and/or the safety target of the apparatus are improved, a control program for securing the safety should be modified.

SUMMARY

It is an object of the present disclosure to provide an in-vehicle controller for controlling according to functional safety standards. It is another object of the present disclosure to provide a non-transitory tangible computer readable medium including instructions for providing an in-vehicle controller. The in-vehicle controller satisfies a new functional safety request with reusing existing software.

According to a first aspect of the present disclosure, an in-vehicle controller includes: a first control element for outputting a first output, which corresponds to functional safety standards, in response to a input; a first platform element for controlling a first software in the first control element; a second control element for outputting a second output, which does not correspond to the functional safety standards, in response to the input; a second platform element for controlling a second software in the second control element; and a comparison coupling element for comparing and coupling the first output and the second output, and for outputting a coupled output to an external control object device. The first platform element controls the first software in the first control element independently from the second platform element, which controls the second software in the second control element.

In the above controller, the conventional software is effectively reused, and the controller can handle the newly developed software corresponding to the new functional safety standards. Further, when the software of the first control element only relates to the function, which is required to correspond to the functional safety standards, the memory capacity of the memory for storing the program in the software is reduced.

According to a second aspect of the present disclosure, an in-vehicle controller includes: a plurality of sequence monitors. Each sequence monitor has an effective, range, and the effective range of one sequence monitor is overlapped to the effective range of another sequence monitor. In this case, since the effective ranges of multiple sequence monitors are overlapped with each other, the check is completely performed with using the sequence monitors.

According to a third aspect of the present disclosure, an in-vehicle controller includes: a first control element for outputting a first output, which corresponds to functional safety standards; in response to a input; a first platform element for controlling a first software in the first control element; a second control element for outputting a second output, which does not correspond to the functional safety standards, in response to the input; a second platform element for controlling a second software in the second control element; and a comparison coupling element for comparing and coupling the first output and the second output, and for outputting a coupled output to an external control object device. The second software of the second control element is assigned to a conventional software, and the first software of the first control element is assigned to a newly developed software.

In the above controller, since the conventional software can be reused, the development cost is reduced.

According to a fourth aspect of the present disclosure, an in-vehicle controller includes: a sequence monitor having an effective range; and a network connection monitor having another effective range, which is overlapped to the effective range of the sequence monitor. In this case, since the effective range of the sequence monitor and the effective range of the network connection monitor are overlapped with each other, the check is completely performed with using the sequence monitor.

According to a fifth aspect of the present disclosure, a non-transitory tangible computer readable medium includes instructions being executed by a computer, the instructions including: storing a first program in a first file; storing a second program in a second file, which is different from the first program; and controlling the first file and the second file individually. The first program relates to a first, software in a first control element, and the second program relates to a second software in a second control element. The first control element outputs a first output, which corresponds to functional safety standards, in response to a input. The second control element outputs a second output, which does not correspond to the functional safety standards, in response to the input. In this case, it is easy to reuse the program (e.g., a QM unit) in the software of the second control element.

According to a sixth aspect of the present disclosure, a non-transitory tangible computer readable medium includes instructions being executed by a computer, the instructions including: controlling a program by a software of a platform element; configuring the program to be detachable independently from the software of the platform element. The program relates to a software corresponding to functional safety standards. In this case, when the non-transitory tangible computer readable medium is used, and the program in the software corresponding to the functional safety standards is attached independently from the software of the platform element, the conventional software is effectively reused, and the non-transitory tangible computer readable medium can handle the new functional safety standards.

According to a seventh aspect of the present disclosure, an in-vehicle controller includes: the non-transitory tangible computer readable medium according to the fifth aspect of the present disclosure. In this case, it is easy to reuse the program (e.g., a QM unit) in the software of the second control element.

According to a eighth aspect of the present disclosure, a non-transitory tangible computer readable medium includes instructions being executed by a computer, the instructions including: configuring a program to be detachable from a software of a platform element. The program relates to a software corresponding to functional safety standards. When the non-transitory tangible computer readable medium is used, and the program in the software corresponding to the functional safety standards is attached with respect to the software of the platform element, the conventional software is effectively reused, and the non-transitory tangible computer readable medium can handle the new functional safety standards.

According to a ninth aspect of the present disclosure, an in-vehicle controller includes: the non-transitory tangible computer readable medium according to the eight aspect of the present disclosure. In this case, the conventional software is effectively reused, and the non-transitory tangible computer readable medium can handle the new functional safety standards.

According to a tenth aspect of the present disclosure, a non-transitory tangible computer readable medium includes instructions being executed by a computer, the instructions including: setting a connection source and a connection object of a daisy chain in order to contacting a program. The program relates to a software corresponding to functional safety standards.

BRIEF DESCRIPTION OF THE DRAWINGS

The above and other objects, features and advantages of the present disclosure will become more apparent from the following detailed description made with reference to the accompanying drawings. In the drawings:

FIG. 7 is a flowchart showing a comparison coupling process;

FIG. 8 is a flowchart showing a process not necessary to conform to the functional safety;

FIG. 13A is a diagram showing functional definitions of a sequence and a time monitor in the electric door ECU, and FIG. 13B is a diagram showing usage ways of the sequence and the time monitor in the electric door ECU;

FIG. 14A is a diagram showing functional definitions of a read/write process and a computing monitor in the electric door ECU, and FIG. 14B is a diagram showing usage ways of the read/write process and the computing monitor in the electric door ECU.

DETAILED DESCRIPTION

The present inventors have studied about an in-vehicle controller and a tangible computer readable medium. Here, for example, a function relating to a door open/close switch of a vehicle will be explained.

Figure 1:
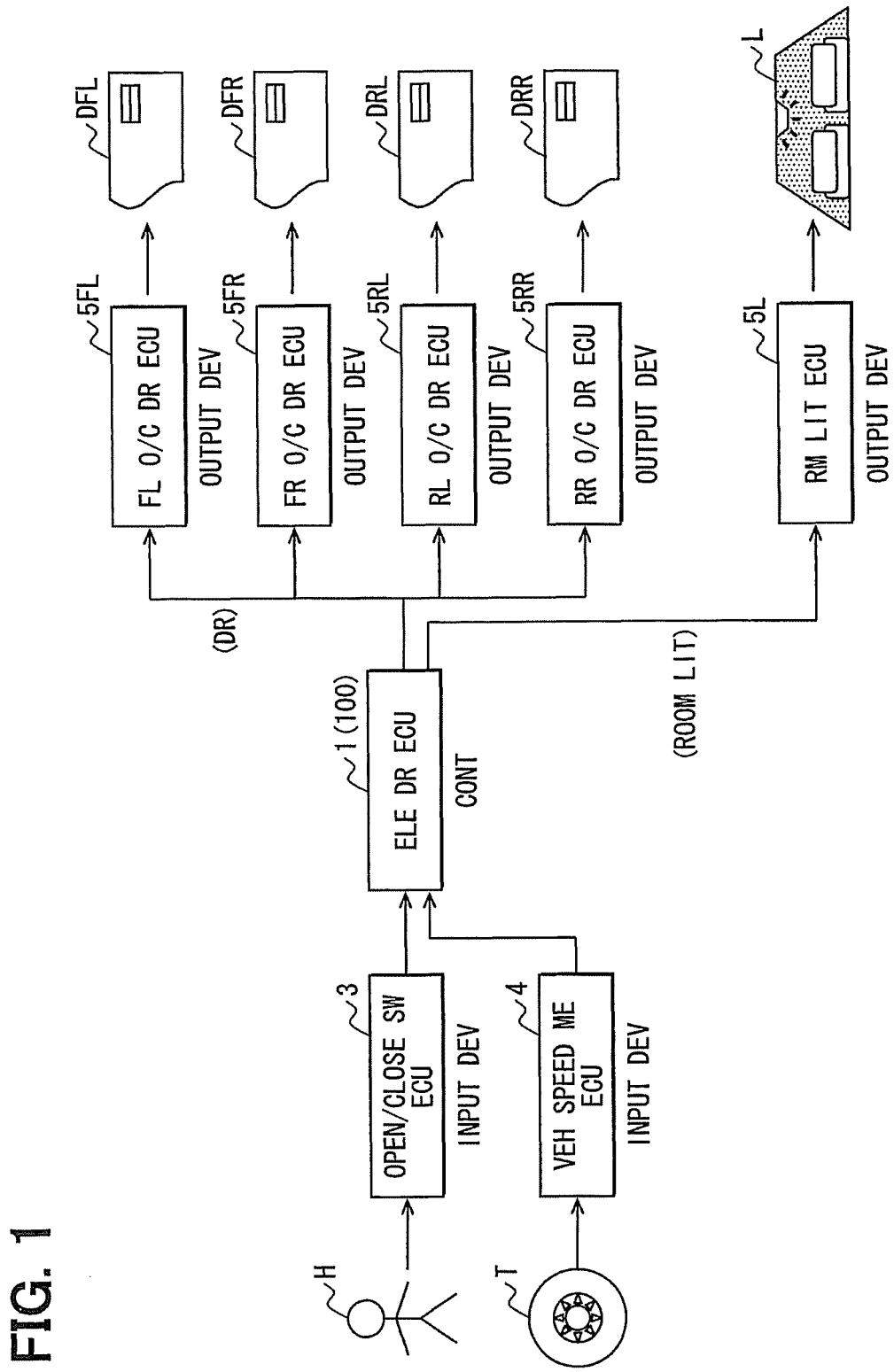
FIG. 1 is a block diagram showing an example of a control system according to an example embodiment.

FIG. 1 is a block diagram showing control system construction of an electric door ECU 1 as the in-vehicle controller for controlling a door D of the vehicle to open and close according to an operation of a door open/close switch by a human H, which is detected by an open/close switch ECU 3, and a vehicle speed measured by a Vehicle speed measurement ECU 4 based on rotation of a tire T. Here, the vehicle includes four doors D. And, a door arranged on a front left side is referred to as a door DFL, and a door arranged on a front right side is referred to as a door DFR. A door arranged on a rear left side is referred to as a door DRL, and a door arranged oh a rear right side is referred to as a door DRR. The doors DFL, DFR, DRL, DRR are controlled to open and close by open/close door ECUs 5FL, 5FR, 5RL, 5RR, respectively. Specifically, an electric actuator automatically controls to open and close the doors DFL, DFR, DRL, DRR. The electric door ECU 1 communicates with a room light L via a room light ECU 5L.

Figure 15:
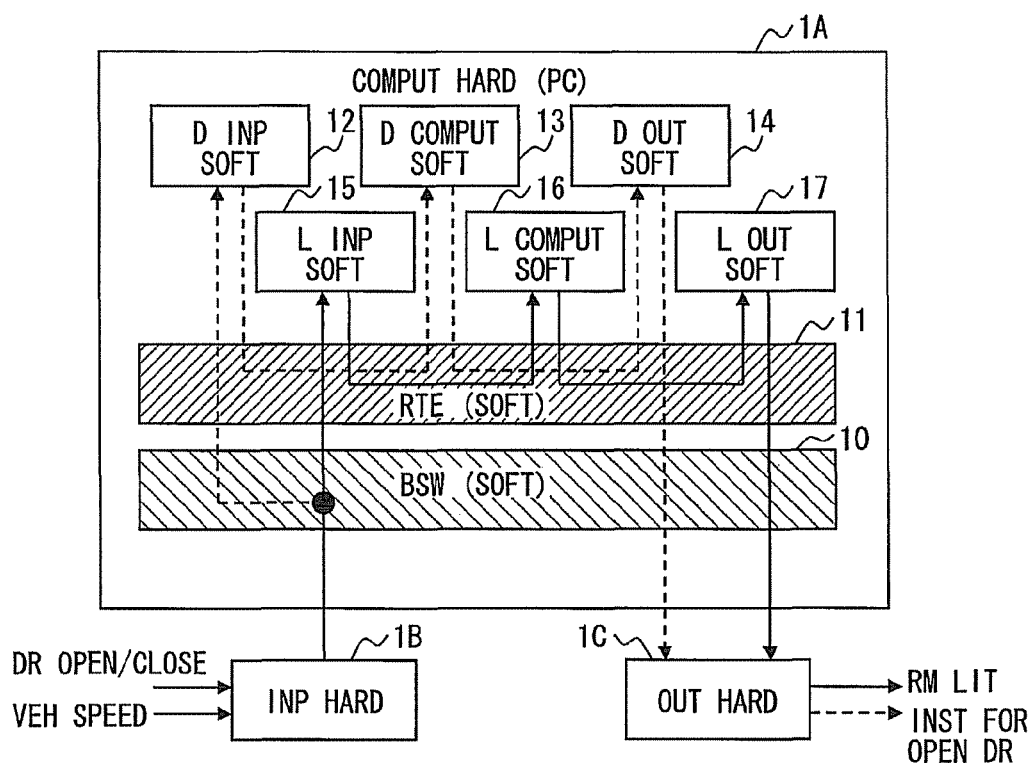
FIG. 15 is a block diagram showing an electric door ECU as a comparison.

FIG. 15 is a block diagram showing a software construction of the electric door. ECU 1. Here, the electric door ECU 1 turns on the room light L for a predetermined time interval LTIME when the user operates the door open/close switch. Further, the ECU 1 executes a control process for opening the door D when the user operates the door open/close switch and the vehicle speed is smaller than 15 km/h. In this case, the turning on control of the room light L is defined as a QM unit (i.e., quality management unit), which does not have necessity for conforming to functional safety standards. However, the door opening control is defined as a ASIL unit, which has necessity for conforming to the functional safety standards such as ASIL-C (i.e., automotive safety integrity level C).

As shown in FIG. 15, the electric door ECU 1 includes, as a hardware device: a computing unit 1A for executing various calculations, which is necessary for the control; an input unit 1B for inputting the operation state of the door open/close, switch and, the vehicle speed, which are transmitted from an open/close switch ECU 3 and the vehicle speed measurement ECU 4 respectively; and an output unit 1C for outputting a control signal to the door device and the room light device. Here, the computing unit 1A, the input unit 1B and the output unit 1C are hardware devices. Next, the software of the computing unit 1A will be explained as follows.

The operation state of the door open/close switch and the vehicle speed, which are input via the input unit 1B, are input into the D input software 12 and the L input software 15 via the BSW (basic software) 10 and the RTE (runtime environment) 11. The BSW 10 and the RTE 11 provide platform software (i.e., infrastructure software). The computing unit 1A includes: as an application program for controlling the door D to open and close other than the platform software, a D input software 12, into which, the operation state of the door open/close switch and the vehicle speed are input; a D computing software 13 for computing according to the input of the D input software 12; and a D output software 14 for outputting the door open instruction in accordance with the computing result of the D computing software 13. Further, the computing unit 1A includes: as an application program for controlling the room light L to turn on and off other than the platform software, a L input software 15, in which the operation state of the door open/close switch and the vehicle speed are input; a L computing software 16 for computing according to the input of the L input software 15; and a L output software 17 for outputting the instruction of turning on the room light L in accordance with the computing result of the L computing software 16. The instructions output from the D output software 14 and the L output software 17 are input into the output unit 1C via the RTE 11 and the BSW 10. Further, the output unit 1C outputs the instructions toward the open/close door ECUs 5FL, 5FR, 5RL, 5RR and/or the room light ECU 5L.

Here, the L input software 15, the L computing software 16 and the L output software 17 are QM units, each of which has no necessity for being compliant with the functional safety standards. The D input software 12, the D computing software 13 and the D output software 14 are ASIL units, each of which has necessity for being compliant with the functional safety standards such as ASIL-C. Accordingly, in order to comply with new functional safety standards, it is necessary to develop at least the D input software 12, the D computing software 13 and the D output software 14 again so as to satisfy subsidiary functions and development processes, which are required by the standards. Here, the D input software 12, the D computing software 13 and the D output software 14 provide functions, which are required to be compliant with the new functional safety standards. For example, when the electric door ECU 1 is compliant with the new functional safety standards, the hazard criterion is, for example, an incident such that, the door of the vehicle is opened when the vehicle speed is equal to or larger than 15 km/h. The safety target of the ASIL-C is that the door of the vehicle is not opened when the vehicle speed is equal to or larger than 15 km/h. The functional failure is, for example, such that the door is opened when the vehicle speed is equal to or smaller than 15 km/h; and the user turns on the door open/close switch. This functional failure triggers the hazard situation. Thus, the functional failure should be required to comply with the ASIL-C. The software such as the D input software 12, the D computing software 13 and the D output software 14, which is required to comply with the ASIL-C, is necessary to provide the subsidiary functions such as control flow monitoring function and to verify consistency of the requirements informally through the inspections. Thus, it is necessary to develop the software again.

In the above case, the incident provided in the present software that the door is opened when the vehicle speed is equal to or smaller than 15 km/h, and the user turns on the door open/close switch, and the platform software (i.e., the BSW 10 and the RTE 11) are cancelled, so that the incident and the platform software are developed again. Therefore, the development cost is high, compared with a case where only a different part is developed. Specifically, when the D input software 12, the D computing software 13 and the D output software 14 are redeveloped in accordance with the new functional safety standards, it is necessary to redevelop the BSW 10 and the RTE 11, which manage each process in the D input software 12, the D computing software 13 and the D output software 14. Further, the redevelopment may generate the reduction of quality in the software.

Figure 2:
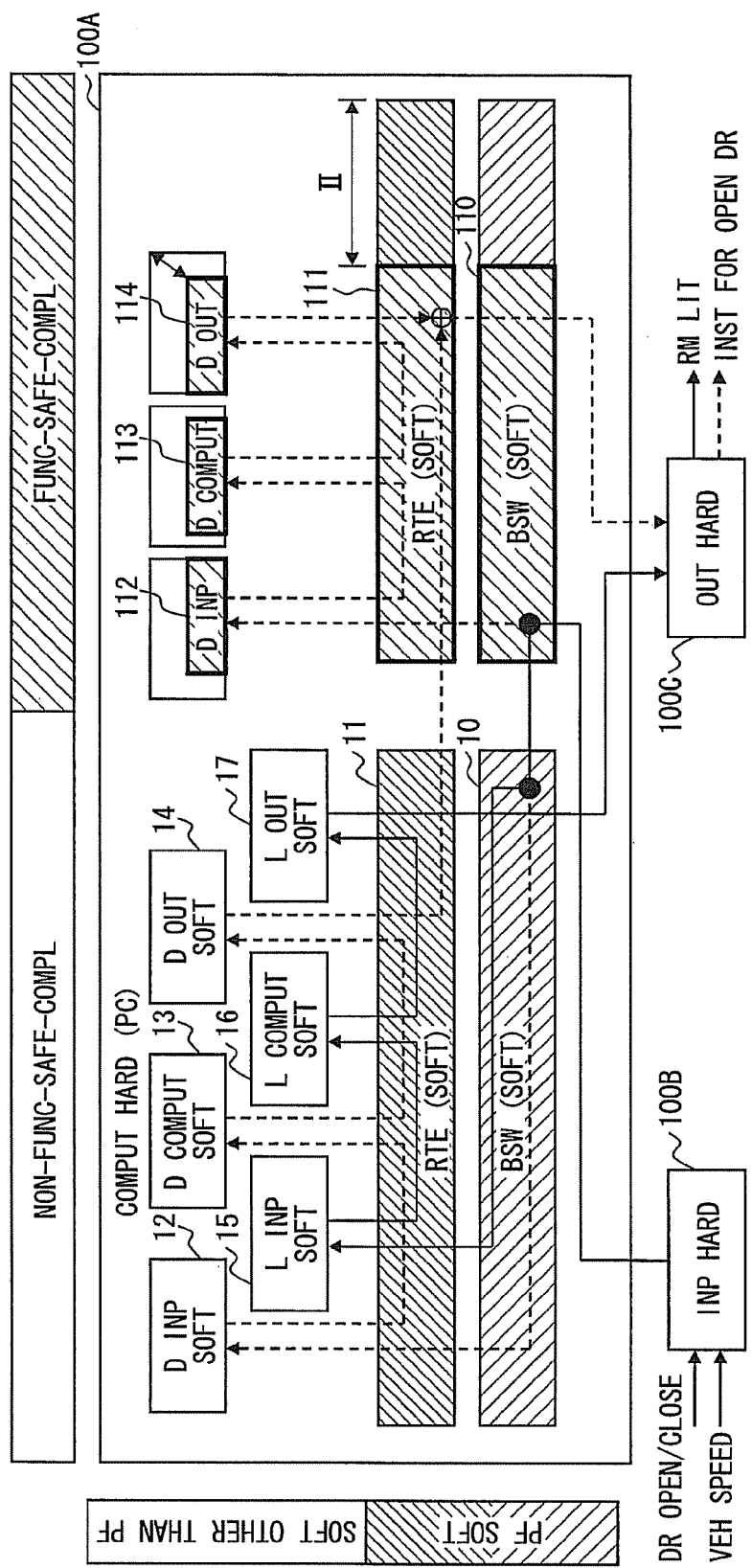
FIG. 2 is a block diagram showing an electric door ECU in the control system.

In view of the above points, embodiments according to the present disclosure will be explained as follows with reference to the drawings. An electric door ECU 100 as an in-vehicle controller is used for the electric door ECU 1 in the control system in FIG. 1, FIG. 2 shows a software constitution of the electric door ECU 100. The electric door ECU 100 executes a control process for turning on the room light L for a predetermine time interval LTIME when the user operates the door open/close switch and a control process for opening the door D of the vehicle when the user operates the door open/close switch and the vehicle speed is smaller than 15 km/h, according to the ASIL-C.

As shown in FIG. 2, the electric door ECU 100 includes, as a hardware device, a computing unit 100A for executing various calculations for the control process; the open/close switch ECU 3; an input unit 100B for inputting the operation state of the door open/close switch and the vehicle speed from the open/close switch ECU 3 and the vehicle speed; ECU 4 respectively; and an output unit 100C for outputting a control signal to the door device and the room light device. Next, the software constitution of the computing unit 100A will be explained as follows.

Similar to the computing unit 1A, the computing unit 100A includes the BSW 10, the RTE 11, the D input software 12, the D computing software 13, the D output software 14, the L input software 15, the L computing software 16, and the L output software 17, as a software constitution. The computing unit 100A further includes: a D input software 112, a D computing software 113 and a D output software 114, which correspond to the ASIL-C as the functional safety standards, in parallel to the D input software 12, the D computing software 13 and the D output software 14, which do not correspond to the ASIL-C. The BSW 10 and the RTE 11 do not correspond to the manager of the D input software 112, the D computing software 113 and the D output software 114. The computing unit 100A further includes the BSW 110 and the RTE 111 in parallel to the BSW 10 and the RTE 11. The BSW 110 and the RTE 111 manage the D input software 112, the D computing software 113 and the D output software 114 independently from the BSW 10 and the RTE 11.

The D input software 112, the D computing software 113 and the D output software 114 are prepared by retrieving a part of the D input software 12, a part a the D computing software 13 and a part of the D output software 14, each of which is required to correspond to the ASIL-C, and by conforming to the ASIL-C. Accordingly, as shown by an arrow II in FIG. 2, the memory capacity for the D input software 112, the D computing software 113 and the D output software 114 is reduced. Further, the memory capacity for the BSW 110 and the RTE 111, which manage the D input software 112, the D computing software 113 and the D output software 114, is also reduced.

Here, the BSW 10 and the RTE 11 correspond to the second platform software. The D input software 12, the D computing software 13 and the D output software 14, the L input software 15, the L computing software 16 and the L output software 17 correspond to the second control device. The D input software 112, the D computing software 113 and the D output software 114 correspond to the first control device. The BSW 110 and the RTE 111 correspond to the first platform software. The RTE 111 further provides the comparison coupling device.

[Process in In-vehicle Controller]

Figure 3:
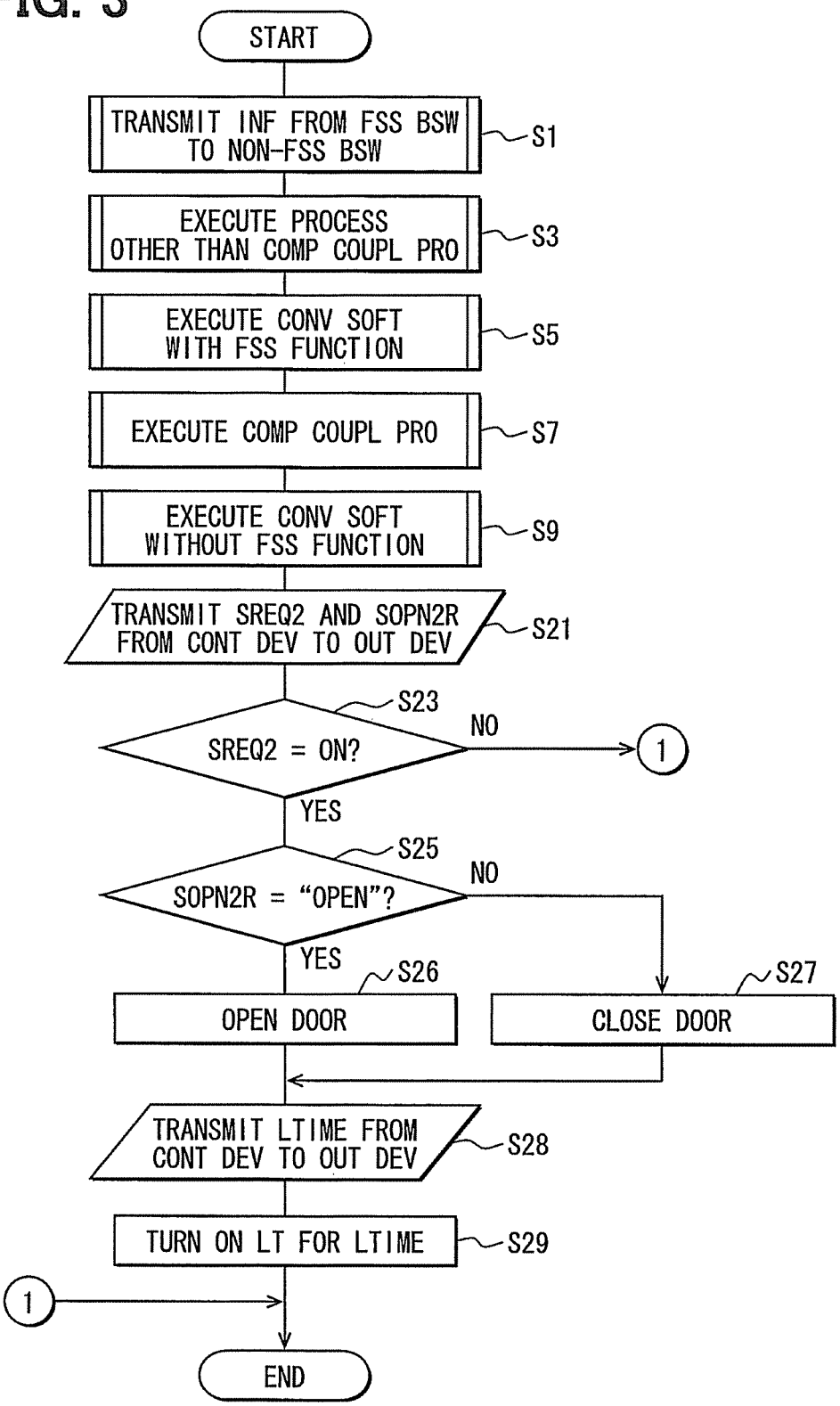
FIG. 3 is a flowchart showing a process in the electric door ECU, an open/close door ECU and a room light ECU.
Figure 4:
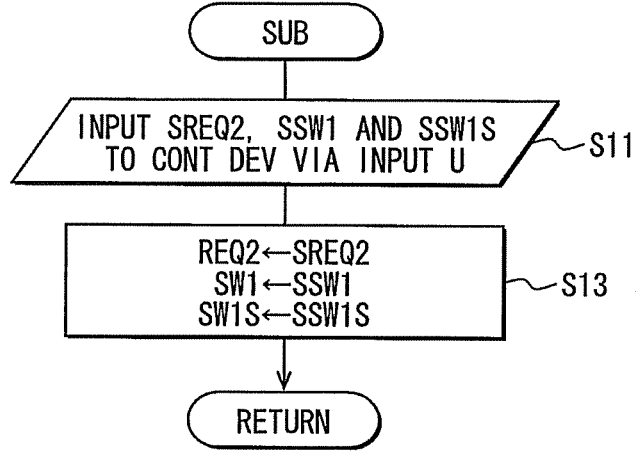
FIG. 4 is a flowchart showing a transmission process between BSWs.

The electric door ECU 100 repeatedly executes steps S1 to S9 in FIG. 3 at predetermined time intervals. As shown in FIG. 3, the ECU 100 executes in step S1 such that the BSW 110 corresponding to the functional safety standards communicates with (i.e., transmits information to) the BSW 10 not corresponding to the functional safety standards. FIG. 4 shows a flowchart of transmission process in step S1. Here, the transmission process is mainly executed by the BSW 110.

As shown in FIG. 4, in step S11 of the transmission process, a variable SREQ2, a variable SSW1 and a variable SSW1S received by the input unit 100B from the open/close switch ECU3 are inputted into the control device via the input unit 100B. Here, the variable SREQ2 represents existence and non-existence of a certain request with respect to the door D. The variable SSW1 represents an on-state and an off-state of the door open/close switch. The variable SSW1S represents an open state and a close state of the door D. In step S13; the variables SREQ2, SSW1 and SSW1S are transmitted from the BSW 110 to the BSW 10 so that the BSW 10 receives the variables as the variables REQ2, SW1 and SW1S. Then, it goes to step S3 in FIG. 3.

Figure 5:
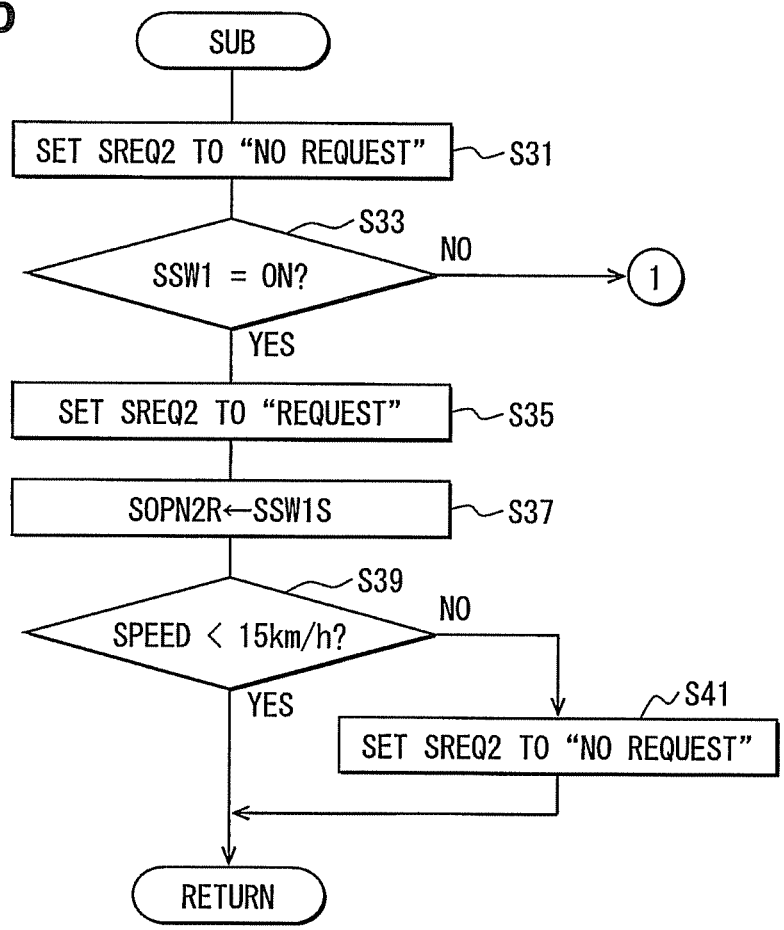
FIG. 5 is a flowchart showing a functional safety process.

In step S3 of FIG. 3, a process other than the comparison coupling process in step S7, which corresponds to the functional safety standards, is executed. FIG. 5 shows the process other than the comparison coupling process. Here, the process is executed with using the D computing software 113.

As shown in FIG. 5, in step S31 of the process, the variable SREQ2 is set to represent "no request." Then, in step S33, the ECU 100 determines whether the variable SSW1 is in the on state, i.e., whether the door open/close switch turns on. When the variable SSW1 is in the off state, i.e., when the determination in step S33 is "NO," it goes to the end step in FIG. 3. Thus, the process ends. When the variable SSW1 is in the on state, i.e., when the determination in step S33 is "YES," it goes to step S35. In step S35, the variable SREQ2 is set to represent "request." Then, in step S37, the value of the variable SSW1S is assigned to the variable SOPN2R.

In step S39, the ECU 100 determines whether the vehicle speed SPEED is smaller than 15 km/h. When the speed is smaller than 15 km/h, i.e., when the determination in step S39 is "YES," it goes to step S5 in FIG. 3. When the speed is equal to or lager than 15 km/h, i.e., when the determination in step S39 is "NO," it goes to step S41. In step S41, the variable SREQ2 is set to represent "no request." Then, it goes to step S5 in FIG. 3.

Figure 6:
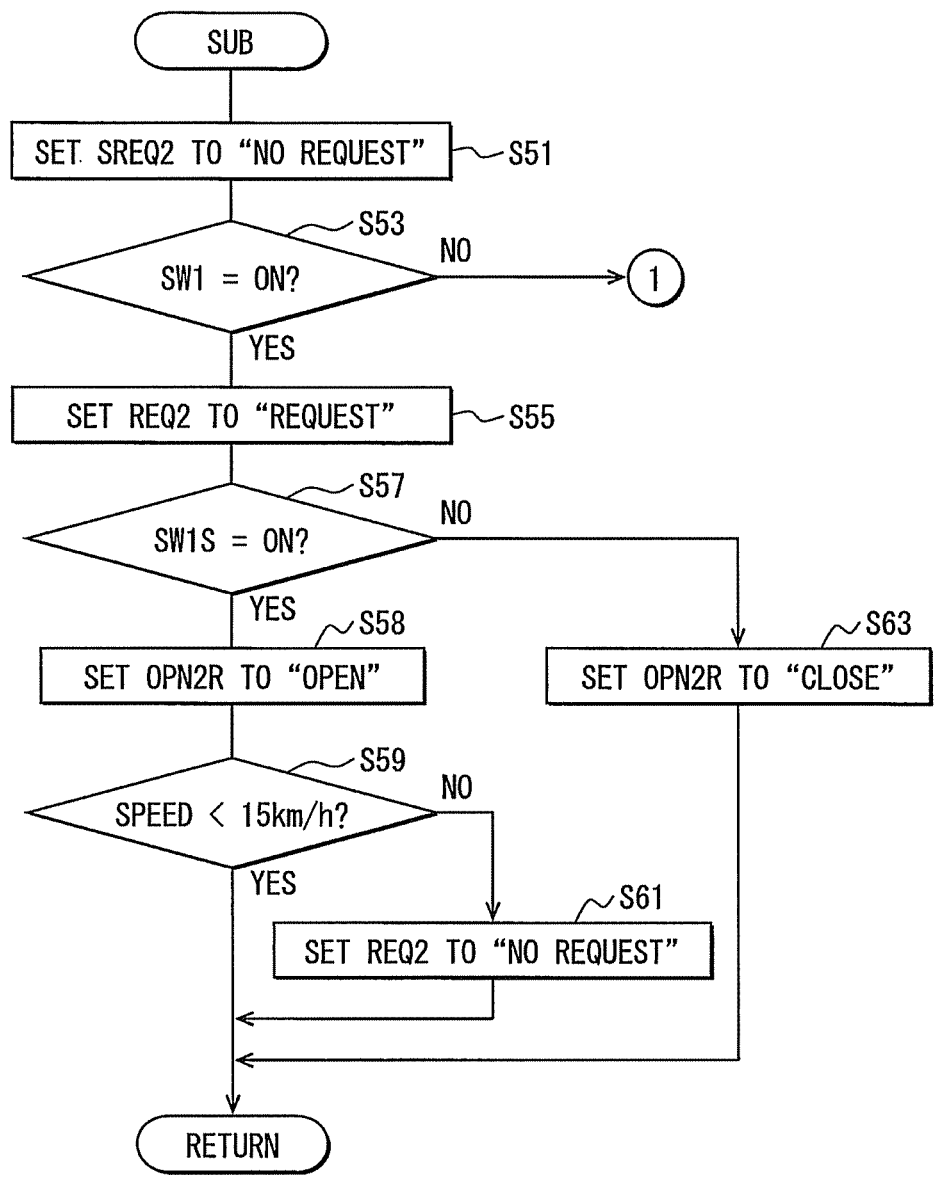
FIG. 6 is a flowchart showing a non functional safety process.

In step S5 of FIG. 3, conventional software including the function, which is required to correspond to the functional safety standards, is executed. FIG. 6 shows a process of the conventional software. Here, the process is executed with using the D computing software 13.

As shown in FIG. 6, in step S61 of the above process, the variable REQ2 is set to represent "no request." Then, in step S53, the ECU 100 determines whether the variable SW1 is in the on state, i.e., whether the door open/close switch turns on. When the variable SW1 is in the off state, i.e., when the determination in step S53 is "NO," it goes to the end step in FIG. 3. Thus, the process ends. When the variable SW1 is in the on state, i.e., when the determination in step S53 is "YES," it goes to step S55. In step S55, the variable REQ2 is set to represent "request." In step S57, the ECU 100 determines whether the variable SW1S is in the on state.

When the variable SW1S is in the on state, i.e., when the determination in step S57 is "YES," in steo S58, the variable OPN2R is set to represent "open."Then, in step S59, the ECU 100 determines whether the vehicle speed is smaller than 15 km/h. When the speed is smaller than 15 km/h, i.e., when the determination in step S59 is "YES," it goes to step S7 in FIG. 3. When the speed is equal to or larger than 15 km/h, i.e., when the determination in step S59 is "NO," it goes to step S61. In step S61, the variable REQ2 is set to represent "no request." Then, it goes to step S7 of FIG. 3. Further, in step S57, when the ECU 100 determines that the variable SW1S is not in the on state, i.e., when the determination in step S57 is "NO," it goes to step S63. In step S63, the variable OPN2R is set to represent "close." Then, it goes to step S7 of FIG. 3.

In step S7 of FIG. 3, the comparison coupling process corresponding to the functional safety standards is executed. FIG. 7 shows the comparison coupling process. This process is mainly executed with using the RTE 111.

As shown in FIG. 7, in step S71 of the process, the value of the variable SREQ2 is substituted to the variable A. Further, the value of the variable REQ2 is substituted to the variable B. In step S73, the ECU 100 determines whether the value of the variable A is equal to the value of the variable B. When the value of the variable A is equal to the value of the variable B, i.e., when the determination in step S73 is "YES," it goes to step S75. In step S75, the value of the variable SOPN2R is substituted to the variable A; and the value of the variable, OPN2R is substituted to the variable B. Then, in step S77, the ECU 100 determines whether the value of the variable A is equal to the value of the variable B. When the value of the variable A is equal to the value of the variable B, i.e., when the determination in step S77 is "YES," it goes to step S79. In step S79, the values of the variables SREQ2 and SOPN2R are transmitted to the output unit 100C. Then, it goes to step S9 of FIG. 3.

When the ECU 100 determines in step S73 or S77 that the value of the variable A is not equal to the value of the variable B, i.e., when the determination in step S73 or S77 is "NO," it goes to step S81. In step S81, the variable SREQ2 is set to represent "no request." Then, it goes to step S79. Specifically, since the control for opening the door D may provide situation. Thus, when the calculation results of the D computing software 13 and 113 are not completely consistent with each other, for example, when the function of the D computing software 13 is failed, the output is transformed to the safety state.

In step S9 of FIG. 3, the ECU 100 executes conventional software not including the function; which is required to correspond to the functional safety standards. FIG. 8 shows the process of the conventional software. Here, the process is mainly executed with using the L computing software 16.

As shown in FIG. 8, in step S91 of the process, the time interval LTIME is set to 15 seconds. Then, in step S93 the information of the time interval LTIME set in step S91 is transmitted to the output unit 100C. Then, it goes to step S21 of FIG. 3. Here, steps after step S21 in FIG. 3 are executed by the open/close door ECU 5.

As shown in step S21 of FIG. 3, the open/close door ECU 5 receives the values of the variables SREQ2 and SOPN2R transmitted in step S79. In step S23, the ECU 5 determines whether the variable SREQ2 is in the on state, i.e., whether the variable SREQ2 represents "request." When the variable SREQ2 is not in the on state, i.e., When the determination in step S23 is "NO," it goes to the end step, so that the process ends. When the variable SREQ2 is in the on state, i.e., when the determination in step S23 is "YES," it goes to step S25. In step S25, the ECU 5 determines whether the variable SOPN2R represents "open."When the variable SOPN2R represents "open," i.e., when the determination in step S25 is "YES," it goes to step S26. In step S26, the ECU 5 controls the door D to open. Then, it goes to step S28. When the variable SOPN2R does not represent "open," i.e., when the determination in step S25 is "NO," it goes to step S27. In step S27, the ECU 5 controls the door D to close. Then, it goes to step S28.

In step S28, the room light ECU 5L receives the value of the time interval LTIME transmitted in step S93. Then, in step S29, the ECU 5L controls the room light L to turn on for the time interval LTIME. Thus, the process ends. Thus, in the present embodiment, the conventional software is effectively used, and further, the ECU 100 satisfies the new functional safety standards as a whole. Further, in the present embodiment, the additional constitution corresponding to the new functional safety standards is prepared by retrieving a part of a program relating to the function required to correspond to the functional safety standards, the part which only, relates to the function required to correspond to the functional safety standards and by conforming the part to correspond to the functional safety standards. Thus, the memory capacity for storing the program is reduced. Further, since the conventional software is used in the BSW 10 to L output, software 17, the manufacturing cost of the ECU 100 is also reduced.

Specifically, in the present embodiment, the D input software 12; the D computing software 13, the D output software 14, which provide the ASIL unit, are divined into the subsidiary functions and the functions other than the subsidiary functions. Then, the subsidiary functions are detachable. Thus, the subsidiary functions are re-used.

Further, the connecting order of the software relating to the RTE 111 and the BSW 110 may be changeable. Further, the execution order of the software relating to the RTE 111 and the BSW 110 may be changeable. Furthermore, the D input software 112, the D computing software 113, and the D output software 114 include the following subsidiary functions, which are different from, the platform software.

(1) Function as a sequence monitor for monitoring the execution order of the program in the software (2) Function as a time monitor for monitoring the execution time of the program in the software (3) Function as a read/write monitor for monitoring the data of the software to read out and to write in (4) Function as a calculation monitor for monitoring the calculation of the data in the software An attachment method for executing the above functions may be following processes.

(1) Process for establishing the sequence monitor, which is capable of setting the connection information and the order identifier of the program changeably (2) Process for establishing the time monitor, which is capable of setting the execution time of the program changeably (3) Process for establishing the read/write monitor, which is capable of specifying the data to be monitored changeably (4) Process for establishing the calculation monitor, which is capable of specifying the data to be monitored changeably, the data being the input data for the calculation and the output data for the calculation The RTE 111 and the BSW 110 includes the following subsidiary functions, which are platform software.

(1) Function as a network connection monitor for monitoring the communication connection (2) Function as a network time monitor for monitoring the execution time of the communication program (3) Function as a network read/write monitor for monitoring the communication data to read out and to write in.

An attachment method for executing the above functions may be following processes.

(1) Process for establishing the network connection monitor, which is capable of setting the communication connection information changeably (2) Process for establishing the network time monitor, which is capable of setting the execution time of the communication program changeably (3) Process for establishing the network read/write monitor, which is capable of specifying the communication data changeably In the present embodiment, the detection points of the functional failure are focused on the following three points, which are the fundamental operations of the computer.

Thus, the program size of the subsidiary function is restricted.

Figure 9:
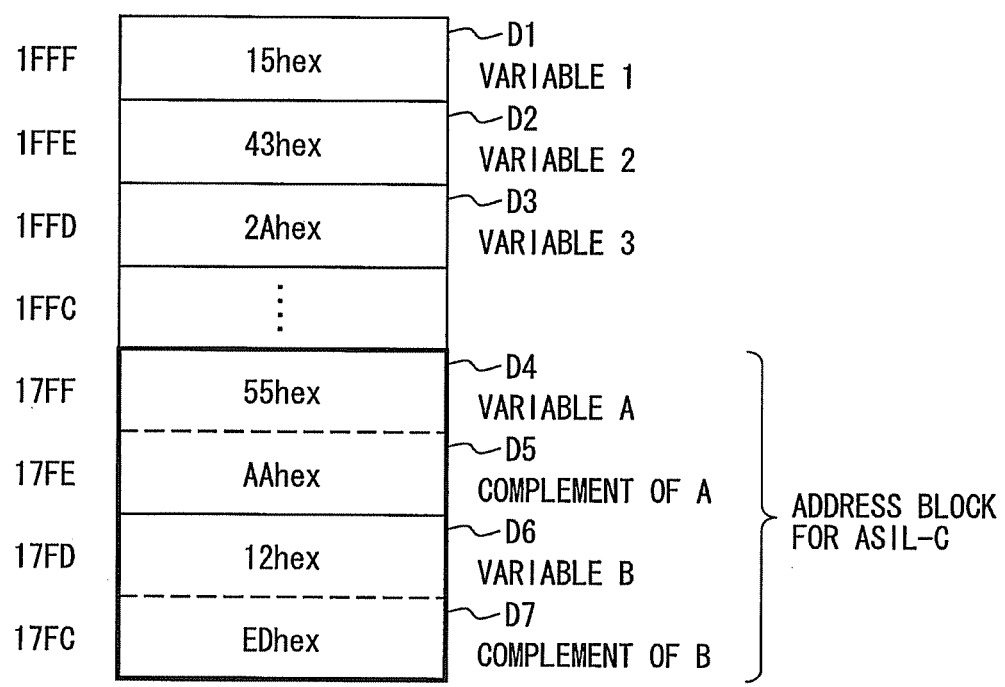
FIG. 9 is a diagram showing data arrangement in the electric door ECU.

(1) Stepwise execution (i.e., program execution) according to the program order relating to the sequence monitor, the time monitor, the network connection monitor and the network time monitor (2) Read out and write in operation of data (i.e., data storing operation) relating to the read/write monitor (3) Calculation of data (i.e., data computing operation) relating to the calculation monitor The constitution of the above functions will be explained as follows. As shown in FIG. 9, the electric door ECU 100 includes a memory having blocks D1-D3 and blocks D4-D7. The blocks D1-D3 store the variables in the program relating to the BSW 10 to the L output software 17. The blocks D4-D7 store the variables in the program relating to the BSW 110 to the D output software, each of which corresponds to the ASIL-C. The blocks D1-D3 and the blocks D4-D7 are arranged in different arrangement blocks. The memory can detach the variables in each arrangement block. Accordingly, the program corresponding to the ASIL-C is easily detachable since the arrangement blocks are detachable or deletable. Thus, the electric door ECU 100 is easily developed to correspond to the new functional safety standards. Alternatively, instead of the detachable arrangement blocks, files may be detachable. In this case, since the file is detachable or deletable, the program corresponding to the ASIL-C is easily detachable.

Figure 10:
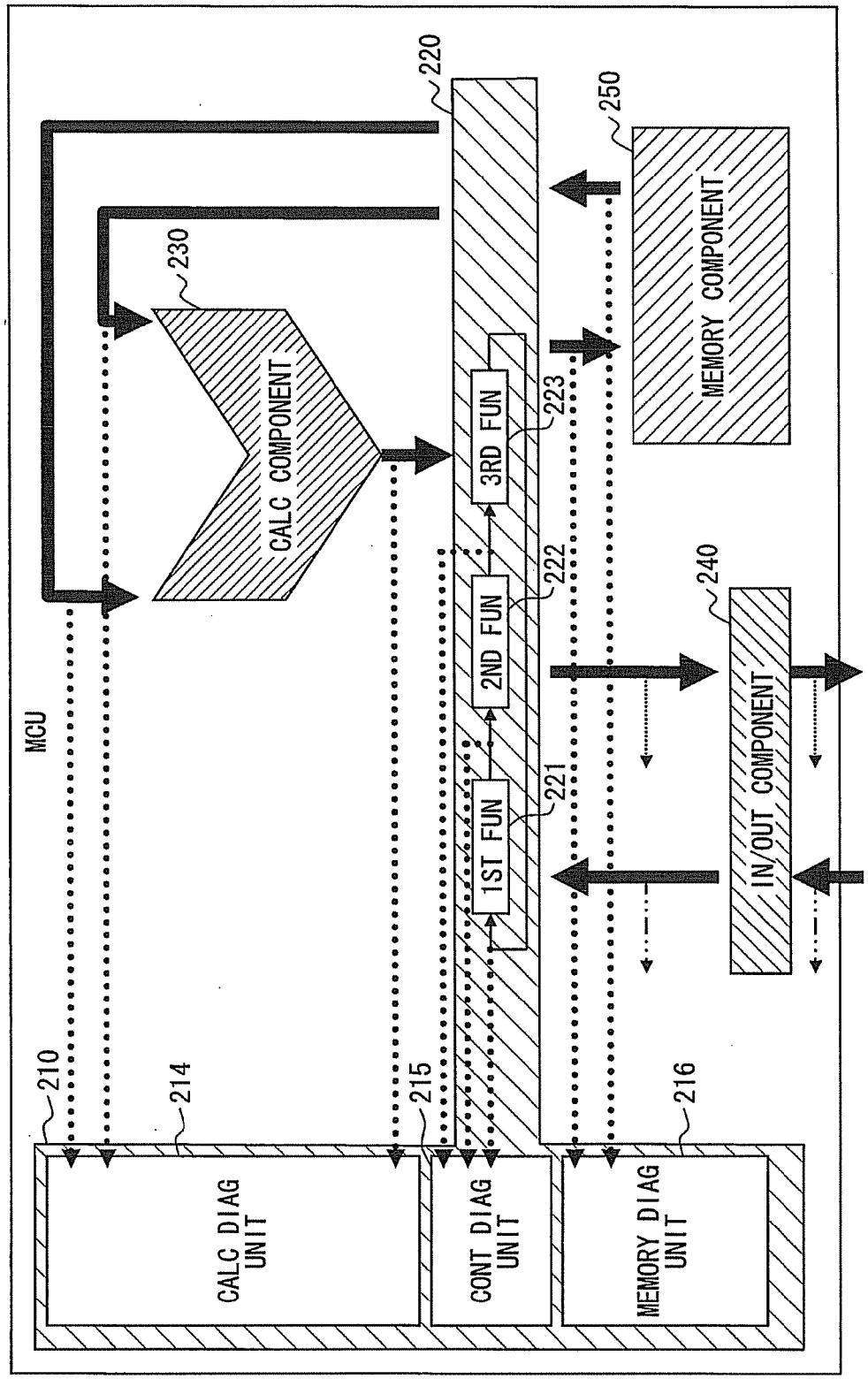
FIG. 10 is a block diagram showing diagnosis component in the electric door ECU.

Next, FIG. 10 shows a diagnosis component of the electric door ECU 100. As shown in FIG. 10, the diagnosis component includes a control component diagnosis function unit 210, a control component 220, a calculation component 230, an input/output component 240, and a memory component 250. The control component diagnosis function unit 210 and the control component 220 are connected to each other. The calculation component 230 receives the data to be calculated from the control component 220, calculates the received data, and sends the calculated data to the control component 220. The input/output component 240 inputs data from an external device to the control component 220, and outputs data to the external device. The memory component 250 is used as a memory for the control component 220.

The control component diagnosis function unit 210 includes a calculation diagnosis unit 214, a control diagnosis unit 215 and a memory diagnosis unit 216. The data input into the calculation component 230 and the calculation results of the data are input into the calculation diagnosis unit 214 so that the calculation diagnosis unit 214 diagnoses the calculation. The control diagnosis unit 215 is arranged in the control component 220. The outputs from the first Fun 221, the second Fun 222 and the third Fun 223 are input into the control diagnosis unit 215 so that the control diagnosis unit 215 diagnoses the control component 220. The data input into and output from the memory component 250 is input into the memory diagnosis unit 216 so that the memory diagnosis unit 216 diagnoses the memory component 250. Here, the first Fun 221 to the third Fun 223 are sequence monitors for detecting whether each function is executed in a predetermined order for a predetermined time interval when the functions are sequentially executed.

Figure 11:
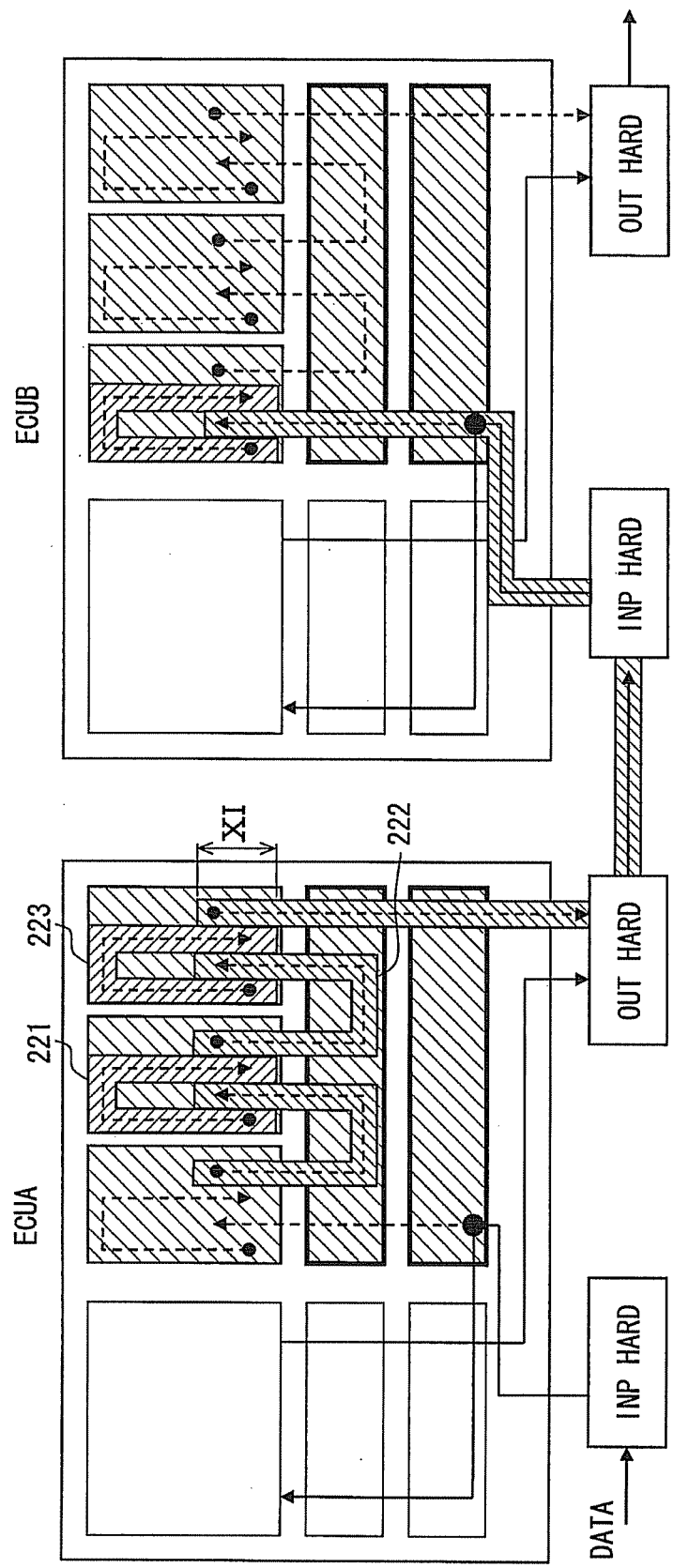
FIG. 11 is a block diagram showing a main part of the diagnosis component.

As shown in FIG. 11, since the monitoring ranges in the first to third Funs 221 to 223 are overlapped in an area shown as an arrow XI, check is performed completely. Here, an effective area of the sequence monitor and an effective area of the network connection may be overlapped to each other. In this case, check is completely performed with using the sequence monitor.

Figure 12:
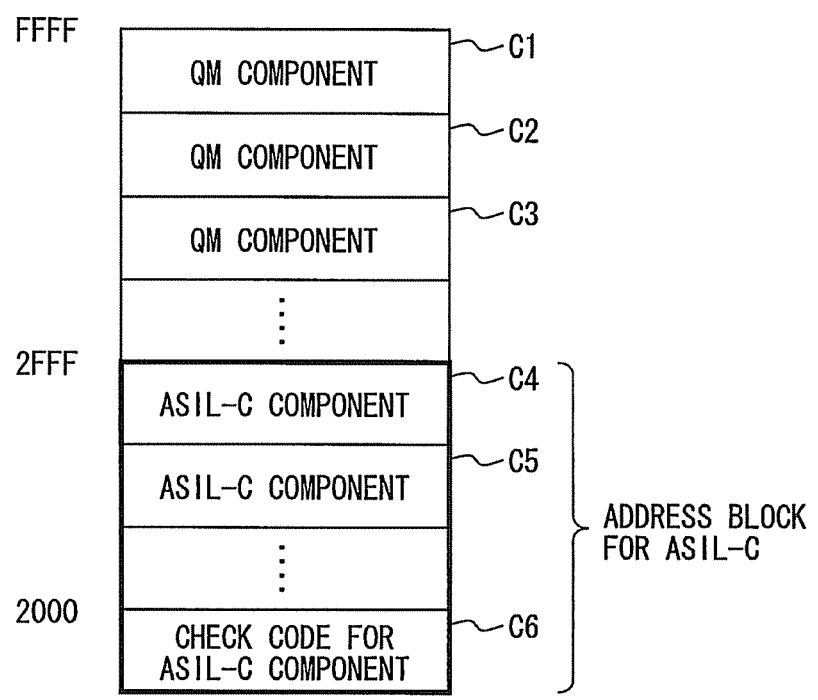
FIG. 12 is a diagram showing component arrangement in the electric door ECU.

As shown in FIG. 12, various components C1-C6 may be arranged in different arrangement blocks in the memory. In the memory, each component C1-C7 in a respective arrangement block may be detachable. Thus, the program corresponding to the ASIL-C is easily detached by removing (e.g., deleting) the arrangement block. Therefore, the electric door ECU 100 is easily developed to correspond to the new functional safety standards. Here, in stead of the arrangement block, a file corresponding to the component may be detachable. In this case, the component corresponding to the ASIL-C is easily detached by removing (e.g., deleting) the file.

Here, a program list relating to the software in the electric door ECU 100 will be shown. FIG. 13A shows a function definition of the sequence and time monitor. FIG. 13B shows a usage way of the sequence and time monitor. FIG. 14A shows a function definition of a read/write process and calculation monitor. FIG. 14B shows a usage way of the read/write process and calculation monitor.

In the above embodiment, the electric door ECU 100 controls the room light L and the door D. Alternatively, the electric door ECU 100 may control only the door D to open and close. In this case, the above described effects are obtained.

The above disclosure has the following aspects.

According to a first aspect of the present disclosure, an in-vehicle controller includes: a first control element for outputting a first output, which corresponds to functional safety standards, in response to a input; a first platform element for controlling a first software in the first control element; a second control element for outputting a; second output, which does not correspond to the functional safety standards, in response to the input; a second platform element for controlling a second, software in the second control element; and a comparison coupling element for comparing and coupling the first output and the second output, and for outputting a coupled output to an external control, object device. The first platform element controls the first software in the first control element independently from the second platform element, which controls the second software in the second control element.

In the above controller, the first platform element controls the first software in the first control element independently from the second platform element, which controls the second software in the second control element. Accordingly, even when the second control element and the second platform element are assigned to a conventional software, and the first control element and the first platform element are assigned to a newly developed software, it is not necessary to modify the second control element and the second platform element according to the newly developed software. Further, since the comparison coupling element compares and couples the first output and the second output appropriately, the controller controls a whole of the first and second software according to the functional safety standards as a whole.

Thus, the conventional software is effectively reused, and the controller can handle the newly developed software corresponding to the new functional safety standards. Further, when the software of the first control element only relates to the function, which is required to correspond to the functional safety standards, the memory capacity of the memory for storing the program in the software is reduced.

Alternatively, one of the first control element, the first platform element, the second platform element and the comparison coupling element functions, or one of combinations selected from the first control element, the first platform element, the second control element, the second platform element and the comparison coupling element may cooperate together; so that occurrence of functional failure of the second control element is restricted.

Alternatively, one of the first control element, the first platform element, the second platform element and the comparison coupling element functions, or one of combinations selected from the first control element, the first platform element; the second control element, the second platform element and the comparison coupling element may cooperate together, so that the coupled output from the comparison coupling element is transferred to a safety state when functional failure of the second control element occurs. Further, the first software in the first control element may be prepared by retrieving a part of programs in the second software of the second control element, the part of programs relating to a function, which is required to correspond to the functional safety standards, and by conforming the part of programs with the functional safety standards. In this case, a decomposition is utilized so that the first software in the first control element is prepared by retrieving a part of programs in the second software of the second control element, the part of programs relating to a function, which is required to correspond to the functional safety standards, and by conforming the part of programs with the functional safety standards. Thus, the memory capacity of the memory for storing the program relating to the software is reduced. Thus, since the function required to correspond to the functional safety standards executes adding a subsidiary function, it is necessary to use a microcomputer having a large program memory in a conventional art when a program size is large, and the function is transferred to and reused in a controller, which is not required to correspond to the functional safety standards. In the above case, the microcomputer having a comparatively small program size may be used.

Alternatively, the in-vehicle controller may control to execute: a first process for inputting the input into the second control element or the second platform element via the first control element or the first platform element; a second process relating to the first control element and the second control element; and a third process relating to the comparison coupling element. The first process to the third process are executed in an order from the first process to the third process via the second process.

Alternatively, a part of or a whole of a process relating to the second control element may be executed between a process other than a process relating to the comparison coupling element and the process relating to the comparison coupling element.

Alternatively, a program in the first software of the first control element may be detachable. In this case, it is easy for the program (e.g., ASIL unit) to correspond to the new functional safety standards.

Alternatively, the in-vehicle controller may further include: a memory having a plurality of arrangement blocks. The arrangement blocks include a first arrangement block and a second arrangement block, which is different from the first arrangement block. The first arrangement block stores a program in the first software of the first control element, and the second arrangement block stores a program in the second software of the second control element. The memory sets an arrangement address in each arrangement block.

According to a second aspect of the present disclosure, an in-vehicle controller includes: a plurality of sequence monitors. Each sequence monitor has an effective range, and the effective range of one sequence, monitor is overlapped to the effective range of another sequence monitor. In this case, since the effective ranges of multiple sequence monitors are overlapped with each other, the check is completely performed with using the sequence monitors.

According to a third aspect of the present disclosure, an in-vehicle controller includes: a first control element for outputting a first output, which corresponds to functional safety standards, in response to a input; a first platform element for controlling a first software in the first control element; a second control element for outputting a second output, which does not correspond to the functional safety standards, in response to the input; a second platform element for controlling a second software in the second control element; and a comparison coupling element for comparing and coupling the first output and the second output, and for outputting a coupled output to an external control object, device. The second software of the second control element is assigned to a conventional software; and the first software of the first control, element is assigned to a newly developed software.

In the above controller, since the conventional software can be reused, the development cost is reduced.

Alternatively, a program in the first software of the first control element may be detachable. In this case, it is easy for the program (e.g., the ASIL unit) to correspond to the new functional safety standards.

Alternatively, the program in the first software of the first control element may be stored in a first file, and a program in the second software of the second control element may be stored in a second file, which is different from the first file. Each of the first file and the second file is detachable. In this case, it is easy to remove the program in the software of the first control element by removing the file.

Alternatively, the in-vehicle controller may further include: a memory having a plurality of arrangement blocks. The arrangement blocks includes a first arrangement block and a second arrangement block, which is different from the first arrangement block. The first arrangement block stores the program in the first software of the first control element, and the second arrangement block stores a program in the second software of the second control element. Each program in a respective arrangement block is detachable in the memory. In this case, it is easy to remove the program in the software of the first control element by removing the arrangement block.

According to a fourth aspect of the present disclosure, an in-vehicle controller includes: a sequence monitor having an effective range; and a network connection monitor having another effective range, which is overlapped to the effective range of the sequence monitor. In this case, since the effective range of the sequence monitor and, the effective range of the network connection monitor are overlapped with each other, the check is completely performed with using the sequence monitor.

According to a, fifth aspect of the present disclosure, a non-transitory tangible computer readable medium includes instructions being executed by a computer, the instructions including: storing a first program in a first file; storing a second program in a second file, which is different from the first program; and controlling the first file and the second file individually. The first program relates to a first software in a first control element, and the second program relates to a second software in a second control element. The first control element outputs a first output, which corresponds to functional safety standards, in response to a input. The second control element outputs a second output, which does not correspond to the functional safety standards, in response to the input. In this case, it is easy to reuse the program (e.g., a QM unit) in the software of the second control element.

According to a sixth aspect of the present disclosure, a non-transitory tangible computer readable medium includes instructions being executed by a computer, the instructions including: controlling a program by a software of a platform element; configuring the program to be detachable independently from the software of the platform element. The program relates to a software corresponding to functional safety standards. In this case, when the non-transitory tangible computer readable medium is used, and the program in the software corresponding to the functional safety standards is attached independently from the software of the platform element, the conventional software is effectively reused, and the non-transitory tangible computer readable medium can handle the new functional safety standards.

Alternatively, the instructions may further includes: providing a function for determining a functional failure according to the functional safety standards. The function includes a sequence monitor, a time monitor, a network connection monitor, a network time monitor, a read and write monitor, and a calculation monitor.

Alternatively, the instructions may further include: providing a sequence monitor having at least one of connection information and an order identifier for the program. The sequence monitor sets the at least one of connection information and the order identifier for the program to be changeable. Further, the sequence monitor may be executed with using the at least one of the connection information and the order identifier, and the sequence monitor is determined as normal when data written in the sequence monitor at a beginning of the program is equal to predetermined data, and data read out from the sequence monitor at an end of the program is equal to another predetermined data.

Alternatively, the instructions may further include: providing a time monitor for setting an execution time of the program to be changeable.

Alternatively, the instructions may further include: providing a function of a sequence monitor and a function of a time monitor at one time.

Alternatively, the instructions may further include: providing a read and write monitor for changing a designation of data to be monitored.

Alternatively, the instructions may further include: providing a calculation monitor for changing a designation of data to be monitored.

Alternatively, the instructions may further include: providing a function for switching a determined function failure to be in a stable state. The function failure is determined by the sequence monitor, the time monitor, the network connection monitor, the network time monitor, the read and write monitor or the calculation function monitor.

According to a seventh aspect of the present disclosure, an in-vehicle controller includes: the non-transitory tangible computer readable medium according to the fifth aspect of the present disclosure. In this case, it is easy to reuse the program (e.g., a QM unit) in the software of the second control element.

According to a eighth aspect of the present disclosure, a non-transitory tangible computer readable medium includes instructions being executed by a computer, the instructions including: configuring a program to be detachable from a software of a platform element. The program relates to a software corresponding to functional safety standards. When the non-transitory tangible computer readable medium is used, and the program in the software corresponding to the functional safety standards is attached with respect to the software of the platform element, the conventional software is effectively reused, and the non-transitory tangible computer readable medium can handle the new functional safety standards.

Alternatively, the instructions may further include: providing a function for determining a function failure according to the functional safety standards. The function includes a network connection monitor or a network time monitor.

Alternatively, the instructions may further include: providing a sequence monitor having at least one of connection information and an identifier for a connection source for the program. The sequence monitor sets the at least one of connection information and the identifier for the connection source for the program to be changeable. Further, the sequence monitor may be executed with using the at least one of the connection information and the identifier for the connection source, and the sequence monitor is determined as normal when data sent from the connection source satisfies with a predetermined rule, and data received by a connection object satisfies with another predetermined rule.

Alternatively, the instructions may further include: providing a time monitor for setting an execution time of the program to be changeable.

Alternatively, the instructions may further include: providing a function of a network connection monitor and a function of a network time monitor at one time.

Alternatively, the instructions may further include: providing a sequence monitor having an effective range; and providing a network connection monitor having another effective range, which is overlapped to the effective range of the sequence monitor.

Alternatively, the instructions may further include: providing a function for switching a determined function failure to be in a stable state.

According to a ninth aspect of the present disclosure, an in-vehicle controller includes: the non-transitory tangible computer readable medium according to the eight aspect of the present disclosure. In this case; the conventional software is, effectively reused, and the non-transitory tangible computer readable medium can handle the new functional safety standards.

According to a tenth aspect of the present disclosure, a non-transitory tangible computer readable medium includes instructions being executed by a computer, the instructions including: setting a connection source and a connection object of a daisy chain in order to contacting a program. The program relates to a software corresponding to functional safety standards.

Alternatively, in the controller according to the first aspect of the present disclosure, when a connection object is set, the connection object may be connected to a non-transitory tangible computer readable medium. The non-transitory tangible computer readable medium includes instructions being executed by a computer. The instructions includes: setting a connection source and a connection abject of a daisy chain in order to contacting a program. The program relates to a software corresponding to functional safety standards.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle controller comprising:
a first control element for outputting a first output, which corresponds to functional safety standards, in response to an input from another control element;
a first platform element for controlling a first software in the first control element;
a second control element for outputting a second output, which does not correspond to the functional safety standards, in response to the input, which is the same as the input of the first control element;
a second platform element for controlling a second software in the second control element; and
a comparison coupling element for comparing and coupling the first output and the second output, and for outputting a coupled output to an external control object device,
wherein the first control element calculates the first output as a calculation result based on the input,
wherein the second control element calculates the second output as a calculation result based on the input,
wherein the first platform element controls the first software in the first control element independently from the second platform element, which controls the second software in the second control element, and
wherein the first control element, the first platform element, the second control element, the second platform element, and the comparison coupling element are provided by one electronic control unit.

2. The in-vehicle controller according to claim 1,
wherein one of the first control element, the first platform element, the second platform element and the comparison coupling element, or one of combinations selected from the first control element, the first platform element, the second control element, the second platform element and the comparison coupling element cooperate together to restrict an occurrence of a functional failure of the second control element.

3. The in-vehicle controller according to claim 1,
wherein one of the first control element, the first platform element, the second platform element and the comparison coupling element, or one of combinations selected from the first control element, the first platform element, the second control element, the second platform element and the comparison coupling element cooperate together to transfer the coupled output from the comparison coupling element to a safety state when functional failure of the second control element occurs.

4. The in-vehicle controller according to claim 3,
wherein the first software in the first control element is prepared by retrieving a part of the second software of the second control element, the part of the second software relating to a function, which is required to correspond to the functional safety standards, and by conforming the part of the second software with the functional safety standards.

5. The in-vehicle controller according to claim 1,
wherein the in-vehicle controller controls to execute: a first process for inputting the input into the second control element or the second platform element via the first control element or the first platform element; a second process relating to the first control element and the second control element; and a third process relating to the comparison coupling element, and
wherein the first process to the third process are executed in an order from the first process to the third process via the second process.

6. The in-vehicle controller according to claim 1,
wherein a part of or a whole of a process relating to the second control element is executed between a process other than a process relating to the comparison coupling element and the process relating to the comparison coupling element.

7. The in-vehicle controller according to claim 2,
wherein a program in the first software of the first control element is detachable.

8. The in-vehicle controller according to claim 2, further comprising:
a memory having a plurality of arrangement blocks,
wherein the arrangement blocks include a first arrangement block and a second arrangement block, which is different from the first arrangement block,
wherein the first arrangement block stores a program in the first software of the first control element, and the second arrangement block stores a program in the second software of the second control element, and
wherein the memory sets an arrangement address in each arrangement block.

9. An in-vehicle controller comprising:
a first control element for outputting a first output, which corresponds to functional safety standards, in response to an input from another control element;
a first platform element for controlling a first software in the first control element;
a second control element for outputting a second output, which does not correspond to the functional safety standards, in response to the input, which is the same as the input of the first control element;
a second platform element for controlling a second software in the second control element; and
a comparison coupling element for comparing and coupling the first output and the second output, and for outputting a coupled output to an external control object device,
wherein the first control element calculates the first output as a calculation result based on the input,
wherein the second control element calculates the second output as a calculation result based on the input,
wherein the second software of the second control element is assigned to a conventional software,
wherein the first software of the first control element is assigned to a newly developed software, and
wherein the first control element, the first platform element, the second control element, the second platform element, and the comparison coupling element are provided by one electronic control unit.

10. The in-vehicle controller according to claim 9,
wherein a program in the first software of the first control element is detachable.

11. The in-vehicle controller according to claim 10,
wherein the program in the first software of the first control element is stored in a first file,
wherein a program in the second software of the second control element is stored in a second file, which is different from the first file, and
wherein each of the first file and the second file is detachable.

12. The in-vehicle controller according to claim 10, further comprising:
a memory having a plurality of arrangement blocks,
wherein the arrangement blocks include a first arrangement block and a second arrangement block, which is different from the first arrangement block,
wherein the first arrangement block stores the program in the first software of the first control element, and the second arrangement block stores a program in the second software of the second control element, and
wherein each program in a respective arrangement block is detachable in the memory.

13. The in-vehicle controller according to claim 1,
wherein, when a connection object is set, the connection object is connected to a non-transitory tangible computer readable medium,
wherein the non-transitory tangible computer readable medium includes instructions being executed by a computer,
wherein the instructions include: setting a connection source and a connection object of a daisy chain in order to contact a program, and
wherein the program relates to a software corresponding to functional safety standards.

14. The in-vehicle controller according to claim 1, wherein the first control element uses the input during the calculation of the first output and the second control element uses the input during the calculation of the second output.

15. The in-vehicle controller according to claim 9, wherein the first control element uses the input during the calculation of the first output and the second control element uses the input during the calculation of the second output.

* * * * *